(12) United States Patent
Simitsis et al.

(10) Patent No.: US 10,515,118 B2
(45) Date of Patent: Dec. 24, 2019

(54) PROCESSING A DATA FLOW GRAPH OF A HYBRID FLOW

(71) Applicant: Hewlett-Packard Development Company, L.P., Houston, TX (US)

(72) Inventors: Alkiviadis Simitsis, Santa Clara, CA (US); William Kevin Wilkinson, San Mateo, CA (US); Petar Jovanovic, Palo Alto, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 421 days.

(21) Appl. No.: 14/897,291

(22) PCT Filed: Jun. 24, 2013

(86) PCT No.: PCT/US2013/047296
§ 371 (c)(1),
(2) Date: Dec. 10, 2015

(87) PCT Pub. No.: WO2014/209260
PCT Pub. Date: Dec. 31, 2014

(65) Prior Publication Data
US 2016/0154896 A1 Jun. 2, 2016

(51) Int. Cl.
*G06F 16/00* (2019.01)
*G06F 16/901* (2019.01)
*G06F 16/23* (2019.01)

(52) U.S. Cl.
CPC ...... *G06F 16/9024* (2019.01); *G06F 16/2372* (2019.01)

(58) Field of Classification Search
CPC ......... G06F 17/30958; G06F 17/30374; G06F 16/9024; G06F 16/2372; G06F 16/00; G06F 17/30
USPC .......................................................... 707/741
See application file for complete search history.

(56) References Cited

U.S. PATENT DOCUMENTS

| | | | |
|---|---|---|---|
| 5,481,741 A * | 1/1996 | McKaskle ............. | G06F 3/0481 345/522 |
| 6,401,216 B1 * | 6/2002 | Meth ................... | G06F 11/1458 712/228 |
| 7,080,088 B1 * | 7/2006 | Lau ........................ | G06F 8/30 |
| 7,703,085 B2 | 4/2010 | Poznanovic et al. | |
| 8,230,411 B1 * | 7/2012 | Vorbach ................. | G06F 8/433 717/154 |

(Continued)

FOREIGN PATENT DOCUMENTS

| | | |
|---|---|---|
| EP | 0231594 | 8/1987 |
| KR | 10-2011-0072495 | 6/2011 |
| WO | WO-2009102903 | 8/2009 |

OTHER PUBLICATIONS

Jovanovic, et al., "Converting a Hybrid Flow", U.S. Appl. No. 13/896,795, filed May 17, 2013, 45 pages.

(Continued)

*Primary Examiner* — Anh Ly

(57) ABSTRACT

Processing a data flow graph of a hybrid flow can include a data structure to store metadata for each of a plurality of nodes of a data flow graph of a hybrid flow, processing the data flow graph of the hybrid flow, and defining metadata in the data structure for a particular node affected during processing of the data flow graph of the hybrid flow.

17 Claims, 7 Drawing Sheets

(56) References Cited

U.S. PATENT DOCUMENTS

| | | | |
|---|---|---|---|
| 2005/0289528 A1* | 12/2005 | Zawawy | G06F 9/4494 717/155 |
| 2007/0198457 A1 | 8/2007 | Olenick et al. | |
| 2007/0214111 A1 | 9/2007 | Jin et al. | |
| 2007/0214171 A1 | 9/2007 | Behnen et al. | |
| 2008/0052687 A1* | 2/2008 | Gonzales-Tuchmann | G06F 8/10 717/140 |
| 2009/0204723 A1* | 8/2009 | Tonsing | H04L 12/5602 709/238 |
| 2010/0138388 A1 | 6/2010 | Wakeling et al. | |
| 2012/0102029 A1 | 4/2012 | Larson et al. | |
| 2014/0344817 A1* | 11/2014 | Jovanovic | G06F 9/5066 718/102 |
| 2014/0344871 A1* | 11/2014 | Martin | H04N 5/44513 725/88 |
| 2014/0359545 A1* | 12/2014 | Kundu | G06F 17/5036 716/107 |
| 2014/0365533 A1* | 12/2014 | Debray | G06F 16/21 707/803 |
| 2014/0372409 A1* | 12/2014 | Weyerhaeuser | G06F 17/30463 707/719 |
| 2016/0283610 A1* | 9/2016 | Simitsis | G06F 8/433 |

OTHER PUBLICATIONS

Olsten, C. et al, "Autoatic Optimization of Parallel Dataflow Program", Apr. 9, 2008.

Simitsis, et al., "Optimizing analytic data flows for multiple execution engines", Proceedings of the 2012 ACM SIGMOD International Conference on Management of Data, Scottsdale, AZ, USA, May 20-24, 2012, 1 page; U.S. Appl. No. 13/896,795, filed May 17, 2013.

* cited by examiner

PROCESSING A DATA FLOW GRAPH OF A HYBRID FLOW

BACKGROUND

A hybrid flow is an analytic flow that may execute on multiple execution engines and/or storage engines. The hybrid flow may be partitioned into fragments where each flow fragment of the hybrid flow can be executed on an execution engine. The fragments may have execution dependencies and/or there may be data flow between fragments. With existing analytic flow design tools and execution engines, hybrid flows can be realized as a collection of scripts and code (e.g., structured query language and Java code) that implement fragments and where the execution of fragments is orchestrated by a separate control flow. A control flow can be referred to as a "job flow".

DETAILED DESCRIPTION

Figure 1:
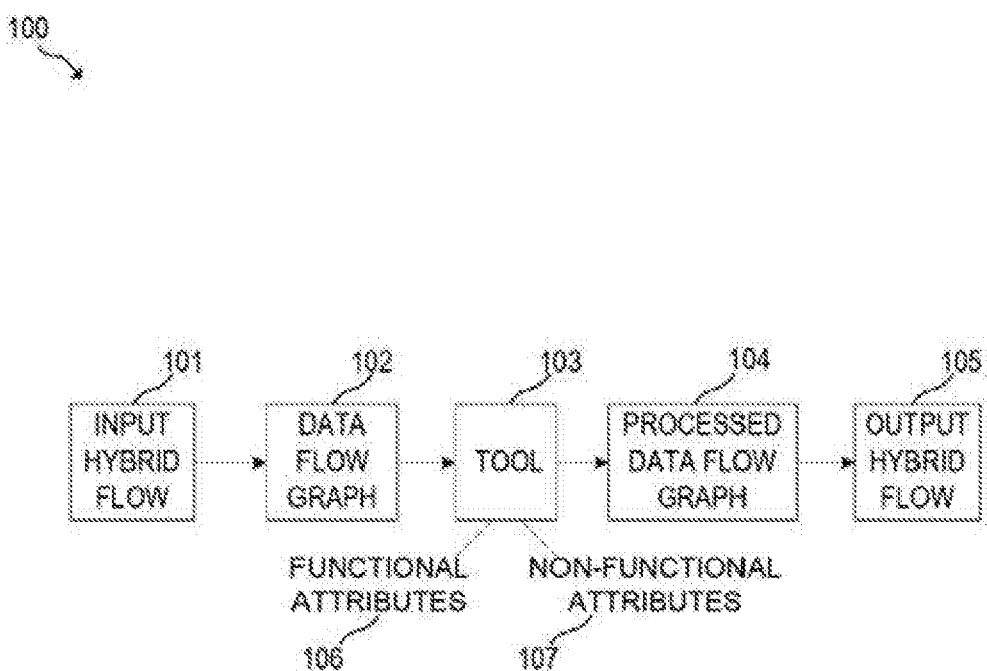
FIG. 1 is a flow diagram of an example of an environment for processing a data flow graph of a hybrid flow according to the present disclosure.

Analytic flow design tools and execution engines can model a hybrid flow at two levels: task flow and job flow. A task flow can contain a series of operators that form a data flow and data stores that contain a collection of data. The data flow can move data from a particular set of input data stores to a set of result data stores and/or can perform operations on the data. A complex analytic flow (e.g., process) may comprise a number of task flows with data and control dependencies. A job flow can represent a control flow for an entire process. For instance, a job flow can show the flow of information and can contain control capabilities like decision points.

A task flow can be represented by a directed graph with a plurality of interconnected operators and data stores, wherein operators and/or data stores are represented as nodes in the graph and the data flow between operators and/or data stores are represented as edges. An operator can include computer-readable instructions that perform a particular function. Such functions can include a type of computation like cleansing, schema modification, data or text analytics, machine learning functions, stream processing operations, event handling, etc. For example, an operator can include computer-readable instructions to "convert dollars to euros" or "calculate the distance between points x and y".

In addition, a job flow can be represented by a directed graph with a plurality of interconnected task flows and control points, wherein task flows and/or control points are represented as nodes in the graph and the control flow of the job flow can be represented as edges connecting nodes. A task node can be associated with a particular task flow. Each task node can represent a data flow computation of the task flow that may run on a particular execution engine. The workflow for the analytic process can be specified by control point nodes. A control point node can specify a partial order in which to process task nodes, starting and stopping points for the analytic process, decision points in the workflow, and/or termination conditions, among other things. An analytic flow that involves multiple execution engines can be referred to as a hybrid flow. Without loss of generality, each task node can be assigned to execute on a single execution engine.

In some instances, processing analytic flows can be beneficial to improve efficiency and operation of the analytic flows. Such processing may involve reordering operators, replicating data across data sources, and/or reassigning operators from one execution engine to another, among other processes. Processing can consider the operators and/or data flow of the analytic flow as a whole rather than as separate task flows.

To globally process a hybrid flow (e.g., process across the entire hybrid flow), a hybrid flow can be converted to a data flow graph that contains both control and data flow characteristics of the hybrid flow. This can be done in an automated fashion, such as without human intervention. Converting a hybrid flow to a data flow graph can include combining graphical structures of a job flow with graphical structures of associated task flows (e.g., task flow graphs that include internal operators of task flows represented by task nodes in the job flow). For instance, operators of a task flow can be combined with task nodes in a job flow graph to flatten (e.g., expand) the job flow graph. The flattened job flow graph can then be converted to a data flow graph by converting the control point nodes to data flow nodes using code templates. The converted data flow graph can preserve control flow semantics of the hybrid flow.

The data flow graph of the hybrid flow can be processed by a tool, such as an optimizer. However, when the data flow graph of the hybrid flow is processed by a tool, control flow semantics of the hybrid flow should remain intact such that the data flow graph can be converted back into a job flow and a plurality of task flows to be dispatched to appropriate execution engines (e.g., as code) and/or to be sent to an analytic flow design tool that it originally came from. The conversion of the hybrid flow to the data flow graph can involve adding a number of new operators (e.g., a connector, extractor, and loader) that are added to the data flow graph to preserve the control flow semantics (e.g., as discussed further herein). In addition, nodes can be revised and new nodes (e.g., operators) can be added during processing of the data flow graph, such that semantics may need to be defined to enable conversion of the data flow graph back into a job flow and plurality of task flows.

For instance, in a variety of examples of the present disclosure, processing a data flow graph of a hybrid flow can be performed in a way that is global and preserves the control flow semantics of the hybrid flow. The global processing of the data flow graph of the hybrid flow can modify the data flow graph while maintaining accurate semantics such that the modified data flow graph can be converted back into a job flow graph and a plurality of task flow graphs to be input into appropriate execution engines.

Additional examples, advantages, features, modifications and the like are described below with reference to the drawings.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

The figures herein follow a numbering convention in which the first digit or digits correspond to the drawing figure number and the remaining digits identify an element or component in the drawing. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

FIG. 1 is a flow diagram of an example of an environment 100 for processing a data flow graph of a hybrid flow according to the present disclosure. The environment 100 can be used to convert a hybrid flow to a single data flow graph (e.g., data flow graph 102) and globally process the single data flow graph of the hybrid flow. The hybrid flow, as used herein, can include a job flow and a plurality of task flows.

The hybrid flow can be represented as a combination of script and/or mixed control flows (e.g., job flows). A hybrid flow can be input 101 into the environment 100 from analytic flow design tools, execution engines and/or other tools. The analytic flow design tools, execution engines, and/or other tools can be used to capture the schemata of nodes (e.g., input, output, parameters, etc.), properties (e.g., selectivity, data size for data storages), and other resources (e.g., memory) and features (e.g., the coordinates of the node on the design canvas, if the input hybrid flow 101 comes from an analytic flow design tool).

The input hybrid flow 101 can be converted to a data flow graph 102 using a conversion tool. The conversion tool can include hardware components and/or software components designated and/or designed to convert a hybrid flow to the data flow graph 102 and/or convert a data flow graph to a hybrid flow (e.g., output hybrid flow 105).

For instance, the data flow graph 102 can be encoded in a logical model (xLM) language, which is an example language to describe data flow graphs such as analytic flows or extract-transfer-load (ETL) flows. As used herein, xLM can include a computer-readable language that is represented in extensible markup language (XML). That is, the data flow graph 102 encoded in xLM language can include a logical model expressed in XML. For instance, a data flow graph 102 encoded in xLM can capture structural information for the hybrid flow, like nodes and edges of the data flow graph 102. In addition, the data flow graph 102 can contain requirements, resource information, features and properties of the hybrid flow, and/or other metadata.

The data flow graph 102 of the hybrid flow can include a plurality of nodes. The nodes can include representations of operators (e.g., internal operators of a task flow represented by a task node in a job flow graph), control point nodes of a job flow graph, and new operators added to convert the input hybrid flow 101 to the data flow graph 102. The new operators added to convert the input hybrid flow 101 to the data flow graph 102 can include new operators added to decompose an operator with multiple functions (e.g., extractor or loader operators) and/or to connect task nodes of a job flow graph (e.g., connector operators). Extractor or loader operators can be added to decompose an operator with multiple functions (e.g., a data store function and a data computation function, such as extraction or load code, as discussed further herein). A connector operator can capture control point logic and information on how to connect task flows. The metadata of the connector operator can encode the type of connection so that a tool can use the knowledge and can calculate the cost of the connector operator. Further, the metadata of the connector operator can include schemata of the connector operator (e.g., input, output, parameters, etc.) that can be used to convert the connector operator back into its original from (e.g., convert the data flow graph 102 to a hybrid flow 105).

The new operators added to the data flow graph 102 can be added to allow a tool 103 to perform a computation or transformation on the data flow graph 102. For instance, an example tool 103 can include an optimizer. An optimizer (e.g., as discussed further below) can produce a global optimal solution. For example, an optimizer can apply a set of transitions to the data flow graph 102 to create a space of alternative data flow graphs called states. Each state can come with a cost, so that the optimizer can search the state space for the state among the alternatives that optimizes a particular function. As an example, an optimizer can assign all operators to run on the same execution engine. This may push the operators down to the execution engine, which may leverage the optimization capabilities of the execution engine.

This technique, sometimes called pushdown optimization, is used by some previous tools. However, pushdown optimization performed by such previous tools is limited to operators running on a database engine and is not applied to the entire data flow graph 102 (e.g., not global). For instance, optimization of a data flow graph 102 of the hybrid flow, in various examples of the present disclosure, can apply pushdown optimization to each alternative data flow graph. Previous tools can optimize a single data flow graph and not each alternative data flow graph (e.g., each state). Further, previous tools apply the pushdown optimization of a task flow at the beginning and end of a job flow; in contrast, optimization of the data flow graph 102 of the hybrid flow can apply to any task flow in a job flow.

The data flow graph 102 (e.g., a single data flow graph of a hybrid flow) can be input to a tool 103. A tool 103 (e.g., a process tool) can include hardware components and/or software components designated and/or designed to process and/or test data flows (e.g., the data flow graph 102). A tool 103 can, for instance, process a single data flow graph at a time. Therefore, a hybrid flow (e.g., a job flow and a plurality of task flows) cannot be processed by such a tool 103 because hybrid flows model computation at two levels and comprise a plurality of flows. Converting the input hybrid flow 101 to the data flow graph 102 enables such a tool 103 to process the hybrid flow (e.g., in the form of the data flow graph 102). For instance, the data flow graph 102 can be input to an optimizer. An optimizer can include a tool to optimize execution of the hybrid flow for a particular function.

The data flow graph 102 can be input to a variety of tools. For instance, the data flow graph 102 can be input to a tool that can decompose a single, long task flow into a single job flow of multiple task flows where each task flow executes after the next. In some instances, the data flow graph 102 can be input to a tool that modifies a job flow that includes task flows that are targeted to execute on a particular engine (e.g., engine x) to a new job flow in which the particular engine (e.g., engine x) is replaced by a different engine (e.g., engine y). In such an instance, the particular engine (e.g., engine x) may be obsolete and/or unavailable. In various instances, the data flow graph 102 can be input to a tool that composes a number of individual task flows into a single job flow (e.g., because the task flows have a common sub-computation).

The tool 103 can, in accordance with various examples of the present disclosure, maintain control flow semantics of the hybrid flow during processing of the data flow graph 102. For instance, the control flow semantics of the hybrid flow can include attributes of the hybrid flow and/or of a plurality of nodes of the data flow graph of the hybrid flow. The attributes, as illustrated in FIG. 1, can include functional attributes 106 and non-functional attributes 107. Functional attributes 106 can be information that is used by the tool 103 to process the data flow graph 102 of the hybrid flow. For instance, functional attributes 106 can include cost estimates and statistics for the job flow and its task flows.

Non-functional attributes 107, as used herein, can be information that is not used by the tool 103 to process the data flow graph 102 of the hybrid flow but that may be used to convert the processed data flow graph 104 into an output hybrid flow 105. For instance, the output hybrid flow 105 can include engine specific encoding for execution on the underlying execution engines. Non-functional attributes 107 can be grouped into two groups: flow metadata and node metadata.

Flow metadata can include non-functional attributes 107 of the job flow and/or a plurality of task flows (e.g., associated task flows that contain internal operators of task flows represented by task nodes in a job flow graph). For instance, flow metadata can include information about database connections, tunable parameters (such as timeouts for various processes, sleep time for threats, shared objects, dependencies, error handling options, etc.), and flow identifier "ID". A flow ID can identify a task flow that each node (e.g., operator) belongs to. For example, task flow 1 may use a database connection 1 (e.g., db1) and task flow 2 may use a database connection 2 (e.g., db2). The flow ID of the task flow 1 and task flow 2 can be used to identify which of the two database connections (e.g., db1 and db2) are being used by an operator. Flow metadata can include, for instance, a list of all flow IDs comprising a job flow.

Node metadata can include non-functional attributes 107 of each node of the data flow graph 102 of the hybrid flow. Each node of the data flow graph 102 of the hybrid flow can include a representation of an operator, a control point, and/or a new node added during conversion of the data flow graph 102 (e.g., extractor operator, loader operator, connector operators, etc.) and/or added during processing of the data flow graph 102 by the tool 103. For instance, node metadata can include a position identifier "ID" (e.g., node coordinate data identifying a position of the node in the job flow), node ID (e.g., a unique identifier of each node), node metadata attribute values (e.g., as discussed further herein), flow ID (e.g., identification of which task flow an operator and/or other node belongs to), and/or execution engine (e.g., which execution engine and/or type of execution engine does a node run on), among other information.

The processed data flow graph 104 and/or the data flow graph 102 can be converted back to a job flow and/or task flows by the conversion tool resulting in an output hybrid flow 105, in various examples of the present disclosure. That is, the tool 103 can perform a computation and/or process resulting in a change to the data flow graph 102 and can send the processed data flow graph 104 back to the conversion tool. Converting the processed data flow graph 104 back to a job flow and/or task flows (e.g., an output hybrid flow 105) can include reconverting each node (e.g., operator node, control point node, and/or new operator node) of the processed data flow graph 104 back into the form that an execution engine expects and/or can process (e.g., as discussed further herein). Fragments of the reconverted hybrid flow can be input into appropriate execution engines. An execution engine, as used herein, can include hardware components and/or computer-readable instruction components designated and/or designed to execute a particular function and/or fragment of a hybrid flow.

Figure 2A:
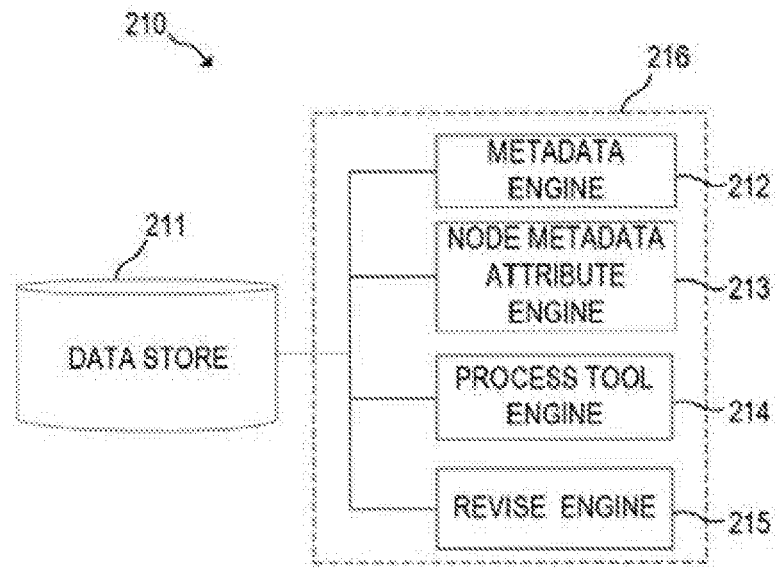
FIGS. 2A-2B illustrate examples of systems according to the present disclosure.
Figure 2B:
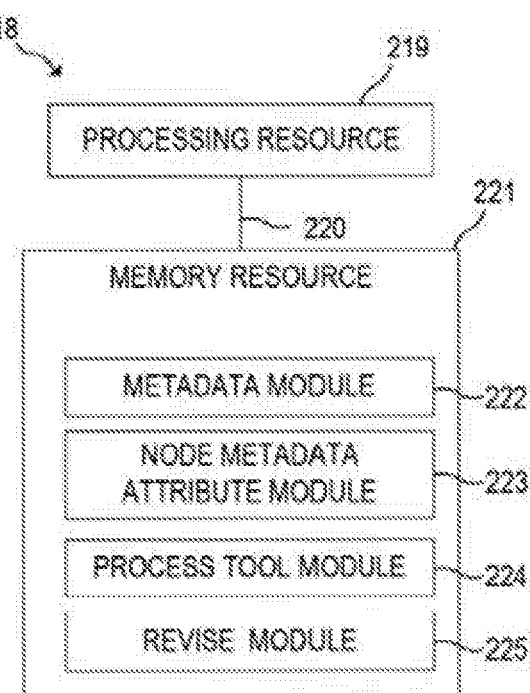

FIGS. 2A-2B illustrate examples of systems 210, 218 according to the present disclosure. FIG. 2A illustrates a diagram of an example of a system 210 for processing a data flow graph of a hybrid flow according to the present disclosure. The system 210 can include a data store 211, processing system 216, and/or a number of engines 212, 213, 214, 215. The processing system 216 can be in communication with the data store 211 via a communication link, and can include the number of engines (e.g., metadata engine 212, node metadata attribute engine 213, process tool engine 214, revise engine 215, etc.) The processing system 216 can include additional or fewer engines than illustrated to perform the various functions described herein.

The number of engines can include a combination of hardware and programming that is configured to perform a number of functions described herein (e.g., store metadata for each of a plurality of nodes of a data flow graph of a hybrid flow in a defined data structure). The programming can include program instructions (e.g., software, firmware, etc.) stored in a memory resource (e.g., computer readable medium, machine readable medium, etc.) as well as hard-wired program (e.g., logic).

The metadata engine 212 can include hardware and/or a combination of hardware and programming to store metadata for each of a plurality of nodes of a data flow graph of a hybrid flow in a defined data structure, wherein the metadata includes flow metadata and node metadata. The defined structure, in various examples, can include a defined data structure in a data flow specification and/or an index data structure.

For instance, in accordance with some examples of the present disclosure, the flow metadata can be stored as a defined data structure in the data flow specification (e.g., xLM flow specification) and the node metadata can be stored in an index data structure. For example, flow metadata can be stored as character data "CDATA" in the xLM flow specification. CDATA can include data that is marked for a parser to interpret as character data, not markup, for instance. An index data structure, as used herein, can include a data structure that includes data retrieval operations using a database table. For example, an index data structure can include a hash map data structure, a dense index, and/or a bitmap index, among other indexes. The index data structure can include paired data for each node including a node ID and node metadata. The node ID can include a unique identifier assigned to each node. When the index data structure is probed (e.g., indexed) with a node ID, node metadata for the node can be accessed.

Since new nodes are added to the data flow graph at a variety of times, a node can be assigned a node metadata attribute value to keep the index data structure synchronized at all times. If the value of the node metadata attribute equals a particular value, one that cannot be used as a node ID (e.g., −1), then the pair of <nodeID, node metadata> outputs the actual node metadata for the node. If the value of the node metadata attribute is not equal to the particular value (e.g., not equal to −1), then the node is a clone node and the value of the node metadata attribute is the node ID of the node from which the clone node is cloned from (e.g., the original node). A clone node, as used herein, can include an identical copy of a node. The pair of <nodeID, node metadata> shows the node metadata of the original node, wherein the node ID in the pair is the node metadata attribute value assigned to the clone node (e.g., the node metadata attribute value assigned to a clone node is the node ID of the original node). Thereby, the value of the node metadata attribute for a clone node shows a node ID of the original node. For example, a node may be cloned to parallelize a task flow (e.g., as discussed further herein).

The node metadata attribute engine 213 can include hardware and/or a combination of hardware and programming to assign a value of a node metadata attribute to each of the plurality of nodes of the data flow graph of the hybrid flow. Each assigned value can identify the node metadata in the index data structure.

The process tool engine 214 can include hardware and/or a combination of hardware and programming to process the data flow graph of the hybrid flow. In various examples, the process tool engine 214 can be an optimizer. For instance, an optimizer can apply a set of transitions to the data flow graph, such as swap, factorize, partition, function and data ship, decomposition, etc., to create a space of alternative data flow graphs called states (e.g., a plurality of alternative data flow graphs). Each state can come with a cost, so that the optimizer can search the state space for the state among the alternatives that optimizes a particular function. Typically, the space state is vast, so it is crucial for performance that each state uses a minimum amount of memory. At the same time, any given state at any given moment should be convertible to executable code (e.g., a job flow and plurality of task flows). Thereby, the metadata (e.g., node metadata) of the operators and those of new operators added to the data flow graph should be available but not stored in each alternative space (e.g., by the metadata engine 212).

The revise engine 215 can include hardware and/or a combination of hardware and programming to define metadata for a particular node affected during processing of the data flow graph of the hybrid flow and assign a value of a node metadata attribute to the particular node. A particular node can include a new node added during processing of the data flow graph and/or a node among the plurality of nodes that is changed during processing of the data flow graph (e.g., as discussed further herein). Defining metadata for a node, as used herein, can include identifying and/or storing metadata for the node in the defined data structure. Defining metadata for a node among the plurality of nodes that is changed during processing of the data flow graph can, for instance, include updating existing metadata in the defined data structure (e.g., re-defining the metadata for the node in the defined data structure).

A particular node affected during processing of the data flow graph of the hybrid flow can, for example, include a new node and/or a revised node added to an alternative data flow graph (e.g., a state) among the plurality during processing of the data flow graph. That is, the revise engine 215 can track metadata changes for each of a plurality of alternative data flow graphs during processing of the data flow graph. The tracked metadata changes can be for unique nodes (e.g., a unique new node or a unique revised node). A unique node can include a node (e.g., new or revised) that has not yet appeared in any previously created alternative data flow graphs. Thereby, the particular node can include a unique node. By tracking metadata for unique nodes in the various alternative data flow graphs, the amount of memory to store metadata for the data flow graph may not be proportional to the variations of the data flow graph produced by the process tool engine 214. Rather, the amount of memory to store an alternative data flow graph can depend on the number of unique nodes in the alternative data flow graph that have not appeared in a previously created alternative data flow graph.

The defined metadata for a particular node, in various examples, can include node metadata. For instance, the metadata for the particular node can include a flow ID, an execution engine, and/or a value of the node metadata attribute. As discussed above, the value of the node metadata attribute assigned (e.g., carried by) the particular node can include a pointer to the appropriate index data structure entry. The flow ID can include an identifier of a task flow that the node belongs to. The execution engine can include an identifier of a current execution engine and/or type of execution engine that the operator runs on. The execution engine can change during processing of the data flow graph, in various examples of the present disclosure. Without loss of generality, a task flow can be executed on the same execution engine and each operator belonging to the task flow can have the same flow ID; therefore, a different flow ID indicates execution on a different execution engine.

In some examples of the present disclosure, a particular node can include a plurality of new nodes added during processing of the data flow graph of the hybrid flow (e.g., new nodes added to an alternative data flow graph during processing). For instance, the plurality of new nodes added can include a clone node of a node (e.g., an identical node of the node) among the plurality of nodes, a fork node, and a merger node (e.g., as discussed further herein). The process tool engine 214 can add each of the new nodes to the data flow graph (e.g., in a state). The revise engine 215 can define metadata for each new node.

In various examples, the process tool engine 214 can switch a position of a first node among the plurality with a second node among the plurality during processing of the data flow graph. The switch can be, for instance, in an alternative data flow graph. The first node can include a connector operator node (e.g., added connector operator to convert the hybrid flow to a data flow graph and/or added during processing) and the second operator node can include a node connected to the first node (e.g., the connector operator node). The revise engine 215 can update the node metadata of the second node to include an execution engine of a third node among the plurality, wherein the third node includes a node connected to the first node (e.g., the connector operator node) prior to the switch of position of the first node and the second node. The update of node metadata can include updating a position identifier of the switched position of the first node and the second node based on the value of the node metadata attribute assigned to the first node and the second node (e.g., as discussed further herein with regards to FIGS. 4A-4D).

In some instances, the system 210 can include a convert engine (e.g., not illustrated in FIG. 2A). The convert engine can include hardware and/or a combination of hardware and programming to convert a hybrid flow to a data flow graph and convert the data flow graph back to a hybrid flow (e.g., a job flow and plurality of task flows). The data flow graph converted back to a hybrid flow, in various instances, can include one of the alternative data flow graphs (e.g., an alternative data flow graph with the lowest cost among the plurality of alternative data flow graphs). The reconverted hybrid flow can be executed on appropriate execution engines.

FIG. 2B illustrates a diagram of an example computing device 218 according to the present disclosure. The computing device 218 can utilize software, hardware, firmware, and/or logic to perform a number of functions described herein.

The computing device 218 can be any combination of hardware and program instructions configured to share information. The hardware, for example can include a processing resource 219 and/or a memory resource 221 (e.g., computer-readable medium (CRM), machine readable medium (MRM), database, etc.) A processing resource 219, as used herein, can include any number of processors capable of executing instructions stored by a memory resource 221. Processing resource 219 may be integrated in a single device or distributed across multiple devices. The program instructions (e.g., computer-readable instructions (CRI)) can include instructions stored on the memory resource 221 and executable by the processing resource 219 to implement a desired function (e.g., store metadata for each of a plurality of nodes of a data flow graph of a hybrid flow).

The memory resource 221 can be in communication with a processing resource 219. A memory resource 221, as used herein, can include any number of memory components capable of storing instructions that can be executed by processing resource 219. Such memory resource 221 can be a non-transitory CRM or MRM. Memory resource 221 may be integrated in a single device or distributed across multiple devices. Further, memory resource 221 may be fully or partially integrated in the same device as processing resource 219 or it may be separate but accessible to that device and processing resource 219. Thus, it is noted that the computing device 218 may be implemented on a participant device, on a server device, on a collection of server devices, and/or a combination of the user device and the server device.

The memory resource 221 can be in communication with the processing resource 219 via a communication link (e.g., a path) 220. The communication link 220 can be local or remote to a machine (e.g., a computing device) associated with the processing resource 219. Examples of a local communication link 220 can include an electronic bus internal to a machine (e.g., a computing device) where the memory resource 221 is one of volatile, non-volatile, fixed, and/or removable storage medium in communication with the processing resource 219 via the electronic bus.

A number of modules 222, 223, 224, 225 can include CRI that when executed by the processing resource 219 can perform a number of functions. The number of modules 222, 223, 224, 225 can be sub-modules of other modules. For example, the metadata module 222 and the node metadata attribute module 223 can be sub-modules and/or contained within the same computing device. In another example, the number of modules 222, 223, 224, 225 can comprise individual modules at separate and distinct locations (e.g., CRM, etc.).

Each of the number of modules 222, 223, 224, 225 can include instructions that when executed by the processing resource 219 can function as a corresponding engine as described herein. For example, the metadata module 222 can include instructions that when executed by the processing resource 219 can function as the metadata engine 212. In another example, the node metadata attribute module 223 can include instructions that when executed by the processing resource 219 can function as the node metadata attribute engine 213.

FIGS. 3A-3D illustrate examples of adding a new node during processing of a data flow graph of a hybrid flow according to the present disclosure. For instance, when processing the data flow graph (e.g., such as creating alternative data flow graphs/states), a new node can be added to the data flow graph to process the data flow graph for a particular function. The new node can include a representation of a new operator added to the data flow graph during processing of the data flow graph by the tool and/or after application of the processing strategy. The new operators can have metadata defined depending on the particular case.

The examples of FIGS. 3A-3D illustrate examples of creating clones of nodes of the data flow graph (e.g., a number of nodes) for flow partitioning or flow replication. Flow partitioning can include partitioning a data set into N pieces and executing N copies of a flow, one for each partition. Flow replication can include running multiple clones of a number of nodes of a data flow graph on the identical data and comparing the results (e.g., if the results are not identical, choose the most common result for fault tolerance).

In some instances, execution engines and/or analytic flow design tools can allow operators to have multiple inputs and/or outputs and allow defining different semantics considering the distribution of that data. For instance, a fork operator can have multiple outputs and data may be copied or distributed in a round robin fashion. A fork operator node can include a representation of a fork operator that creates multiple outputs for partitioning and/or replication. Example fork operators can include a splitter or a router. In the data flow graph, such information may not be encoded inside nodes (e.g., an operator node) for enabling processing opportunities and may be stored in the defined data structure. During processing and/or after processing, a fork operator (e.g., a splitter and a router) can be added to create the multiple outputs for partitioning and/or replication.

In addition, some execution engines and/or analytic design tools can allow multiple inputs to be merged for operators to be defined and can allow defining different semantics considering the distribution of the data that is input in a variety of ways (e.g., round robin merging, sort merging, etc.). Such information may not be encoded inside nodes (e.g., an operator node) in the data flow graph to enable processing opportunities and can be stored in the defined data structure. A merger operator node can include a representation of a merger operator that merges multiple inputs. Example merger operators can include a round robin merger operator and a sort merger operator, among others merger operators. A merger operator node can be added to merge multiple inputs for a consumer node. A consumer node, as used herein, can include a node representing an operator whose input schema matches the output schema of the previous operator (e.g., the merger operator). Such merger operators and/or fork operators can be removed to reconvert the data flow graph back into a hybrid flow using the stored metadata.

Figure 3A:
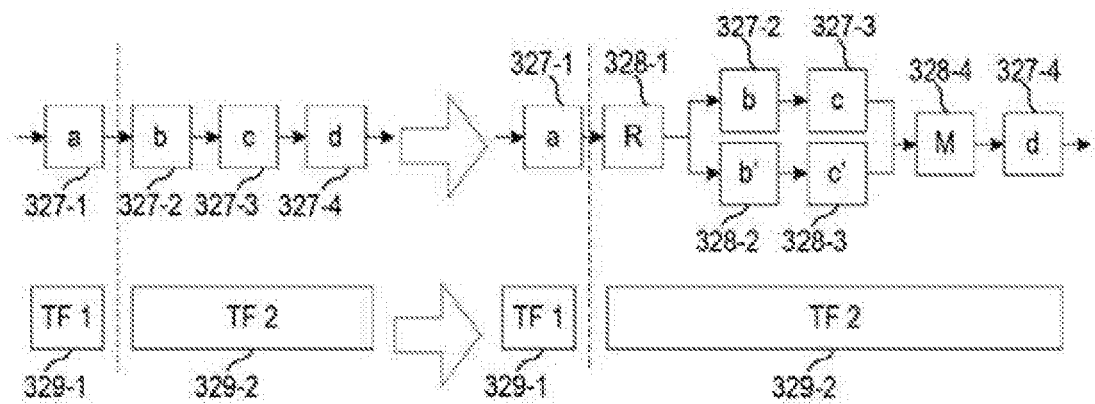
FIGS. 3A-3D illustrate examples of adding a new node during processing of a data flow graph of a hybrid flow according to the present disclosure.

For instance, as illustrated in FIG. 3A, a portion of the data flow graph can include node a 327-1, node b 327-2, node c 327-3, and node d 327-4. The portion can include multiple task flows (e.g., task flow "TF" 1 329-1, and TF 2 329-2). As illustrated, node b 327-2 and node c 327-3 can be parallelized or replicated (e.g., for optimization and/or other purposes) to create N branches containing clone operators (e.g., identical operators), which are executed independently from each other (e.g., in separate threads). After parallelizing or replicating the nodes, new nodes can be added to the data flow graph including node R 328-1, node b' 328-2, node c' 328-3, and node M 328-4. For instance, node b' 328-2 can include a clone node of node b 327-2 and node c' 328-3 can include a clone node of node c 327-3. Node R 328-1 can include a fork node (e.g., a router operator node "R" 328-1) and node M 328-4 can include merger node that split and merge the portion of the data flow graph, respectively.

Metadata for the new nodes (e.g., node R 328-1, node b' 328-2, node c' 328-3, and node M 328-4) can be defined. For instance, each new node can have node metadata and properties defined, such as flow ID, execution engine, and value of a node metadata attribute. The metadata for the new nodes can be defined based on the execution engines of the node that was cloned (e.g., the original node b 327-2 and node c 327-3), a producer node of the new node, and/or a consumer node of the new node. In some instances (though not illustrated by FIGS. 3A-3D), all nodes (e.g., all operators represented by the nodes) can belong to the same task flow. In such an instance, flow ID, execution engine, and value for node metadata attribute of node b 327-2 and node c 327-3 can be defined for node b' 328-2 and node c' 328-3, respectively. The same flow ID and execution engine can be defined for the fork node (e.g., node R 328-1) and merger node (e.g., node M 328-4). FIGS. 3A-3D illustrate examples of defining metadata and properties to particular nodes wherein the particular nodes of the fragment of the data flow graph belong to different task flows.

As illustrated in FIG. 3A, node a 327-1 belongs to task flow "TF" 1 329-1, and node b 327-2, node c 327-3, and node d 327-4 belong to TF 2 329-2. A node that belongs to a task flow can mean that the node (e.g., node a 327-1) runs on a particular engine (e.g., engine 1). After parallelizing or replicating node b 327-2 and node c 327-3, node b 327-2, node c 327-3, node d 327-4, and the plurality of new nodes (e.g., node R 328-1, node b' 328-2, node c' 328-3, and node M 328-4) belong to and get their metadata from TF 2 329-2 (e.g., flow ID, execution engine, etc.). Getting metadata from a task flow, as used herein, can include defining a metadata in the data structure based on the task flow. Node a 327-1 belongs (e.g., remains belonging) to TF 1 329-1.

Figure 3B:
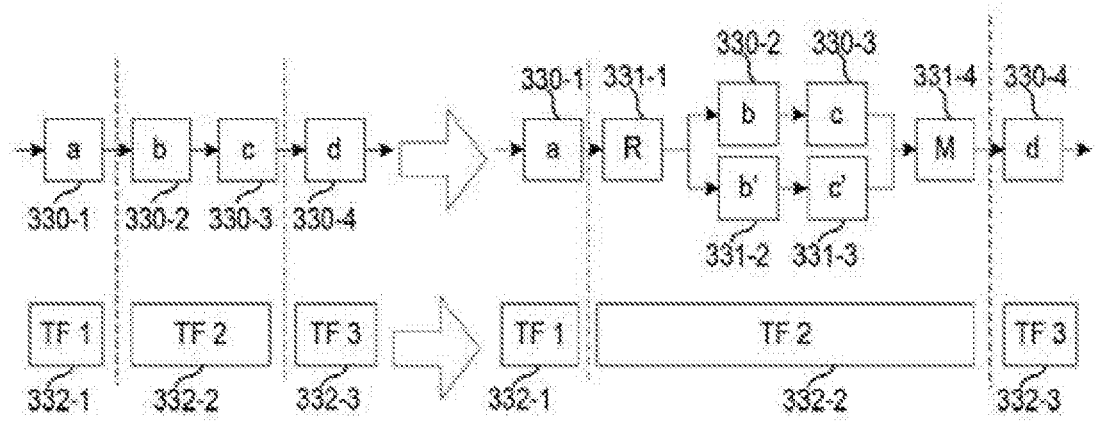

As illustrated in FIG. 3B, node a 330-1 belongs to TF 1 332-1, node b 330-2 and node c 330-3 belong to TF 2 332-2, and node d 330-4 belongs to TF 3 332-3. After parallelizing or replicating node b 330-2 and node c 330-3, node b 330-2, node c 330-3, and the plurality of new nodes (e.g., node R 331-1, node b' 331-2, node c' 331-3, and node M 331-4) belong to and get their metadata and properties from TF 2 332-2 (e.g., flow ID, execution engine, etc.). Node a 330-1 belongs (e.g., remains belonging) to TF 1 332-1 and node d 330-4 belongs (e.g., remains belonging) to IF 3 332-3.

Figure 3C:
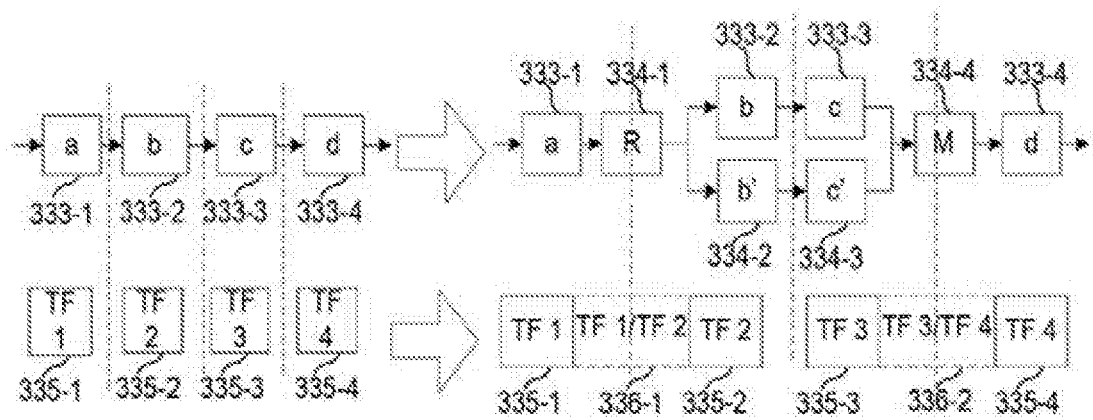

As illustrated in FIG. 3C, in some instances, the parallelized or replicated nodes (e.g., node b 333-2 and node c 333-3) can belong to different task flows (e.g., TF 2 335-2 and IF 3 335-3) and can be executed on different execution engines. This case can be treated at the job flow level. As illustrated in FIG. 3C, node a 333-1 belongs to IF 1 335-1, node b 333-2 belongs to TF 2 335-2, node c 333-3 belongs to TF 3 335-3, and node d 333-4 belongs to TF 4 335-4. Such a job flow can include a specialized job flow containing operators executed on different execution engines. This job flow can be partitioned or replicated by adding new connector operator nodes (e.g., fork node "R" 334-1 and merger node "M" 334-4).

For instance, a job flow may comprise a plurality of task flows that are connected to each other in a variety of ways. The task flows may be between the same execution engine, such as data that may be stored on a file system as they pass from one task flow to another and/or data that is pipelined from one task flow to another. In addition, task flows may be connected between different execution engines (such as engine 1 and engine 2), wherein the data is transferred through the file system of either execution engine and/or the data is pipelined from one task flow to another. Data transferred from one task flow to another may be regulated by a control point operator (e.g., an operator that performs a control function). To uniformly capture semantics (e.g., metadata), a connector operator node can be added to the data flow graph as a regular node. The metadata of the connector operators can encode the type of connections for processing of the data flow graph and for conversion of the data flow graph back into a job flow graph and a plurality of task flows. In various examples, a merger operator and/or a fork operator can include a connector operator.

After parallelizing or replicating node b 333-2 and node c 333-3, new nodes (e.g., node R 334-1, node b' 334-2, node c' 334-3, and node M 334-4) can be added to the data flow graph. Node b' 334-2 and node c' 334-3 can include clone nodes of node b 333-2 and node c 333-3, respectively. The new clone nodes (node b' 334-2 and node c' 334-3) can belong to and get metadata and properties of the task flows of the nodes they are a clone of. For example, node b 333-2 and node b' 334-2 can belong to TF 2 335-2. Node c 333-3 and clone node c' 334-3 can belong to TF 3 335-3. Node a 333-1 belongs (e.g., remains belonging) to TF 1 335-1 and node d 333-4 belongs (e.g., remains belonging) to TF 4 335-4.

The new nodes of the node R 334-1 and node M 334-4 that include specialized connector operator nodes to connect the task flows can belong to either the task flow of their consumer node or the task flow of their producer node (e.g., as illustrated by the dotted lines going through node R 334-1 and node M 334-4). As used herein, a consumer operator node can include a representation of an operator whose input schema matches the output schema of an operator represented by a previous node (e.g., the connector operator). A producer node can include a representation of an operator whose output schema matches the input schema of the predecessor operator (e.g., the connector operator).

For instance, node R 334-1 can belong to TF 1 335-1 or TF 2 335-2 (e.g., as illustrated by TF 1/TF 2 336-1). Node M 334-4 can belong to TF 3 335-3 or TF 4 335-4 (e.g., as illustrated by TF 3/TF 4 336-2). Which task flow the specialized connector operators (e.g., node R 334-1 and node M 334-4) belong to, and thereby, get their metadata and properties from can depend on the cost of shipping data (e.g., the network and data transfer cost) from an engine that TF 1 335-1 runs on (e.g., engine 1) to an engine that TF 2 335-2 runs on (e.g., engine 2), and from an engine that TF 3 335-3 runs on (e.g., engine 3) to an engine that TF 4 335-4 runs on (e.g., engine 4). Example criterion for placement of the fork operator (e.g., node R 334-1) can be the existence or not of parallel copy connectors. Example criterion for placement of the merger operator (e.g., node M 334-4) can be merging policy (e.g., union, sort-merge, etc.).

Figure 3D:
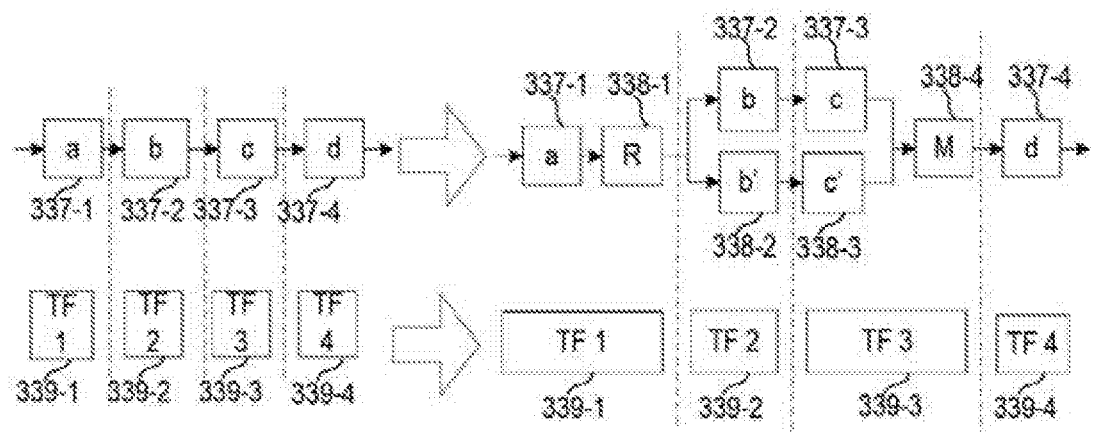

FIG. 3D illustrates an example of placement of a fork node (e.g., node R 338-1) and the merger node (e.g., node M 338-4) based on the cost of shipping data in accordance with examples of the present disclosure. FIG. 3D, in various examples, can include a particular placement of the nodes in FIG. 3C, although examples in accordance with the present disclosure are not so limited.

As illustrated by FIG. 3D, the node a 337-1 can belong to TF 1 339-1, node b 337-2 can belong to TF 2 339-2, node c 337-3 can belong to TF 3 339-3, and node d 337-4 can belong to TF 4 339-4. After parallelizing or replicating node b 337-2 and node c 337-3, new nodes (e.g., node R 338-1, node b' 338-2, node c' 338-3, and node M 338-4) can be added to the data flow graph. Node b' 338-2 and node c' 338-3 can include clone nodes of node b 337-2 and node c 337-3, respectively. The new clone nodes (e.g., node b' 338-2 and node c' 338-3) can belong to and get metadata and properties from the task flows of the nodes they are a clone of. For example, node b 337-2 and clone node b' 338-2 can belong to TF 2 339-2. Node c 337-3 and clone node c' 338-3 can belong to TF 3 339-3. The new fork node (e.g., node R 338-1) can belong to TF 1 339-1 (e.g., as opposed to TF 2 339-2) based on the data shipping cost being lower with the fork operator represented by the fork node belonging to TF 1 339-1 than TF 2 339-2. The new merger node (e.g., node M 338-4) can belong to TF 3 339-3 (e.g., as opposed to TF 4 339-4) based on the data shipping cost being lower with the merger operator represented by the merger node belonging to TF 3 339-3 than TF 4 339-4. Node a 337-1 belongs (e.g., remains belonging) to TF 1 339-1 and node d 337-4 belongs (e.g., remains belonging) to TF 4 339-4.

Although the examples of FIGS. 3A-3D illustrate a particular number of each particular feature (e.g., nodes, new nodes, task flows, and branches), examples in accordance with the present disclosure are not so limited. The number of each particular feature can include a variety of numbers that may be more or less than illustrated in FIGS. 3A-3D, for instance.

FIGS. 4A-4D illustrate examples of switching positions of nodes of a data flow graph of a hybrid flow according to the present disclosure. The nodes that are switched, as illustrated in FIGS. 4A-4D, can include unary nodes. A unary node can include a node with a single input and/or a single output. If the nodes belong to the same task flow, then flow ID, execution engine, and value of the node metadata attribute remain the same for the switched nodes. In such an instance, only the position identifier of the switched nodes may be revised (e.g., an identifier that identifies of the order of the nodes).

Figure 4A:
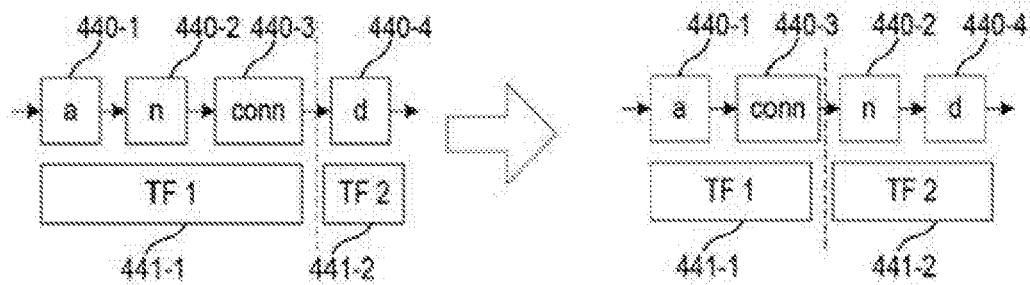
FIGS. 4A-4D illustrate examples of switching positions of nodes of a data flow graph of a hybrid flow according to the present disclosure

FIG. 4A illustrates an example of switching two unary nodes (e.g., node n 440-2 and node connector "conn" 440-3) in a data flow graph containing node a 440-1, node n 440-2, node conn 440-3, and node d 440-4. Prior to switching a position of the nodes, node a 440-1, node n 440-2 and node conn 440-3 belong to TF 1 441-1 and node d 440-4 belongs to TF 2 441-2. A connector operator node (e.g., node conn 440-3) can include a representation of an operator added during conversion of the hybrid flow to a data flow graph and/or during processing of the data flow graph. The metadata of the connector operator node can encode the type of connection between two task flows. Thereby, when switching the position of a connector operator node (e.g., node conn 440-3) and a unary node (e.g., node n 440-2), two task flows (e.g., TF 1 441-1 and TF 2 441-2) are involved. The unary node switching positions with the connector operator node has metadata defined based on a node (e.g., node d 440-4) that was a consumer node (e.g., was connected to) of the connector operator node (e.g., node conn 440-3) prior to the switch. That is, node n 440-2 has metadata updated based on a consumer node (e.g., node d 440-4) of the connector operator node (e.g., node conn 440-3) prior to the switch, wherein node n 440-2 was a producer node for the connector operator node prior to the switch.

As illustrated on the right side of the arrow, switching a position of a connector operator node (e.g., node conn 440-3) with node n 440-2 results in changes to metadata and properties of the node n 440-2. The metadata and properties of the connector operator node may not change. After the switch, node a 440-1 and node conn 440-3 belong to TF 1 441-1. Node n 440-2 and node d 440-4 belong to TF 2 441-2. Thereby, node n 440-2 gets the flow ID and execution engine metadata of the consumer node (e.g., node d 440-4) of the node conn 440-3 prior to the switch.

Figure 4B:
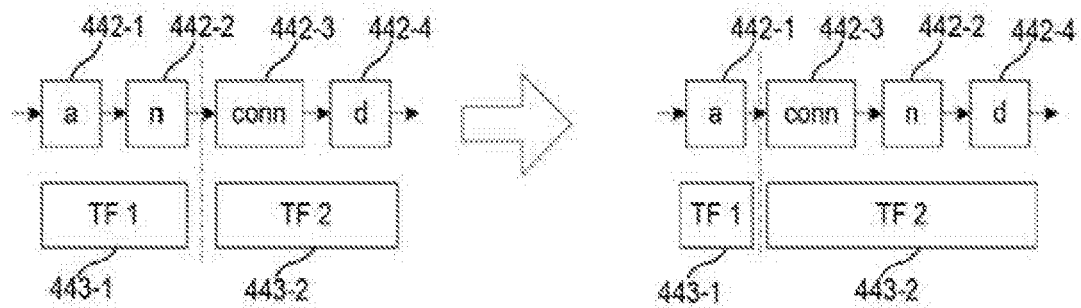

FIG. 4B illustrates an example of switching two unary nodes (e.g., node n 442-2 and node conn 442-3) in a data flow graph containing node a 442-1, node n 442-2, node conn 442-3, and node d 442-4. Prior to switching a position of the nodes, node a 442-1 and node n 442-2 belong to TF 1 443-1 and node conn 442-3 and node d 442-4 belong to TF 2 443-2. The node conn 442-3 can include a connector operator node, as discussed in FIG. 4A. The unary node (e.g., node n 442-2) switched with the connector operator node (node conn 442-3) has metadata defined based on a node (e.g., node d 442-4) that was a consumer node (e.g., was connected to) of the connector operator node prior to the switch. That is, node n 442-2 has metadata updated based on a consumer node (e.g., node d 442-4) of the connector operator node (e.g., node conn 442-3) prior to the switch, wherein node n 442-2 was a producer node of the connector operator node prior to the switch.

As illustrated on the right side of the arrow, switching a position of the node conn 442-3 with node n 442-2 results in changes to metadata and properties of the node n 442-2. The metadata and properties of the connector operator node do not change. After the switch, node a 442-1 belongs to TF 1 443-1. Node conn 442-3, node n 442-2, and node d 442-4 belong to TF 2 443-2. Thereby, node n 442-2 gets a flow ID and execution engine metadata of the consumer node (e.g., node d 442-4) of the node conn 442-3 prior to the switch updated in the defined data structure.

Figure 4C:
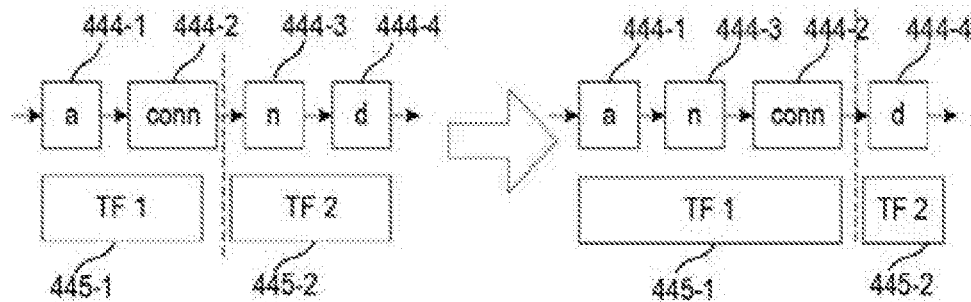

FIG. 4C illustrates an example of switching two unary nodes (e.g., node conn 444-2 and node n 444-3) in a data flow graph containing node a 444-1, node conn 444-2, node n 444-3, and node d 444-4. Prior to switching a position of the nodes, node a 444-1 and node conn 444-2 belong to TF 1 445-1 and node n 444-3 and node d 444-4 belong to TF 2 445-2. The node conn 444-2 can include a connector operator node, as discussed in FIG. 4A. The unary node (e.g., node n 444-3) switched with the connector operator node (node conn 444-2) has metadata defined based on a node (e.g., node a 444-1) that was a producer node (e.g., was connected to) of the connector operator node (e.g., node conn 444-2) prior to the switch. That is, node n 444-3 has metadata updated based on a producer node (e.g., node a 444-1) of the connector operator node (e.g., node conn 444-2) prior to the switch, wherein node n 444-3 was a consumer operator node of the connector node prior to the switch.

As illustrated on the right side of the arrow, switching a position of the node conn 444-2 with node n 444-3 results in changes to metadata and properties of the node n 444-3. The metadata and properties of the connector operator node (e.g., node conn 444-2) do not change. After the switch, node a 444-1, node n 444-3, and node conn 444-2 belong to TF 1 445-1. Node d 444-4 belongs to TF 2 445-2. Thereby, node n 444-3 gets a flow ID and execution engine metadata of the producer node (e.g., node a 444-1) of the node conn 444-2 prior to the switch updated in the defined data structure.

Figure 4D:
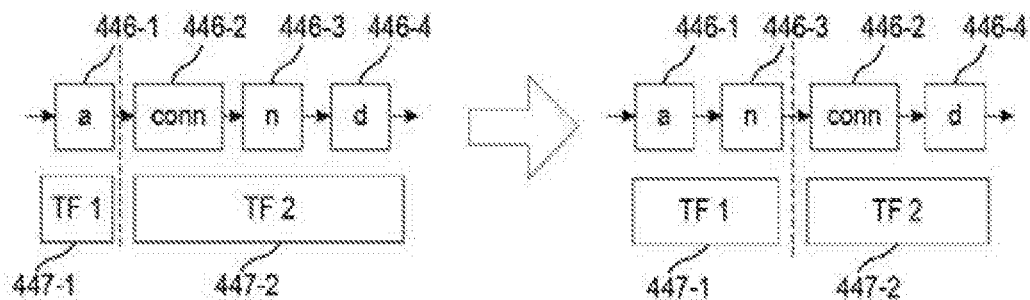

FIG. 4D illustrates an example of switching two unary nodes (e.g., node conn 446-2 and node n 446-3) in a data flow graph containing node a 446-1, node conn 446-2, node n 446-3, and node d 446-4. Prior to switching a position of the nodes, node a 446-1 belongs to TF 1 447-1, and node conn 446-2, node n 446-3 and node d 446-4 belong to TF 2 447-2. The node conn 446-2 can include a connector operator node, as discussed in FIG. 4A. The unary node (e.g., node n 446-3) switched with the connector operator node (node conn 446-2) has metadata defined based on a node (e.g., node a 446-1) that was a producer node (e.g., was connected to) of the connector operator node (e.g., node conn 446-2) prior to the switch. That is, node n 446-3 has metadata updated based on a producer node (e.g., node a 446-1) of the connector operator node (e.g., node conn 446-2) prior to the switch, wherein the node n 446-3 was a consumer node of the connector operator node prior to the switch.

As illustrated on the right side of the arrow, switching a position of the node conn 446-2 with node n 446-3 results in changes to metadata and properties of the node n 446-3. The metadata and properties of the connector operator node (e.g., node conn 446-2) do not change. After the switch, node a 446-1 and node n 446-3 belong to TF 1 447-1. Node conn 446-2 and node d 446-4 belong to TF 2 447-2. Thereby, node n 446-3 gets a flow ID and execution engine metadata of the producer node (e.g., node a 446-1) of the node conn 446-2 prior to the switch updated in the defined data structure.

Although the examples of FIGS. 4A-4D illustrate four nodes and two task flows, examples in accordance with the present disclosure are not so limited. The number of each particular feature can include a variety of numbers that may be more or less than illustrated in FIGS. 4A-4D, for instance.

In accordance with various examples of the present disclosure, metadata for a switched node can be updated in response to the switch of position. For instance, if a value of a node metadata attribute for a switched node (e.g., node n) equals a first particular value (e.g., −1) than a position identifier in the data structure (e.g., index data structure) corresponds to the node identifier of the node and should be updated based on the switched position. If the value of the node metadata attribute for a switched node equals a second particular value (e.g., −2) than no change to the metadata of the switched node is defined. A second particular value can indicate no node metadata exists for the node. If the value of the node metadata attribute is not equal to the either the first particular value or the second particular value (e.g., is not equal to −1 or −2) for a switched node, then the switched node is a clone of another node whose node identifier is the value stored in the node metadata; this value shows the position identifier of the original node and no node metadata is changed. This assumes that b.ndMetadata !=c and c.ndMetadata !=n, which is generally true, since a clone node is generally not in the same linear flow with its original operator (e.g., clone nodes are introduced after partitioning/replication/distribution/factorization, in which cases the clone nodes and original nodes are placed on a different linear flow).

In some examples, an auxiliary processing node (e.g., a recovery node) can be attached to a node. For instance, if one of the nodes involved in a switch of positions has an auxiliary processing node attached, then the node metadata and the position identifier of the attached auxiliary processing node remains the same in the index data structure. However, the flow ID and execution engine metadata for the auxiliary processing node are updated to match the attached node (e.g., the node that was switched). Thereby, the auxiliary processing node can serve its purpose (e.g., act as a recovery point) after switching positions of nodes.

Figure 5A:
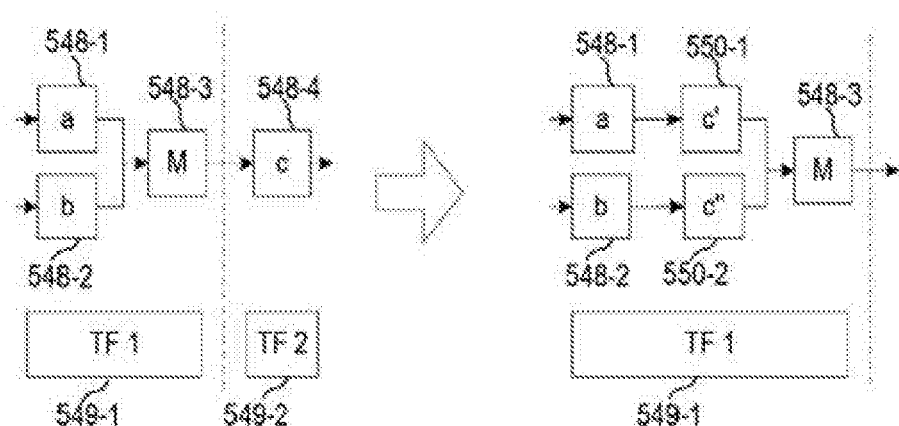
FIGS. 5A-5B illustrate examples of distributing/factorizing a node over an n-ary node of a data flow graph of a hybrid flow according to the present disclosure.
Figure 5B:
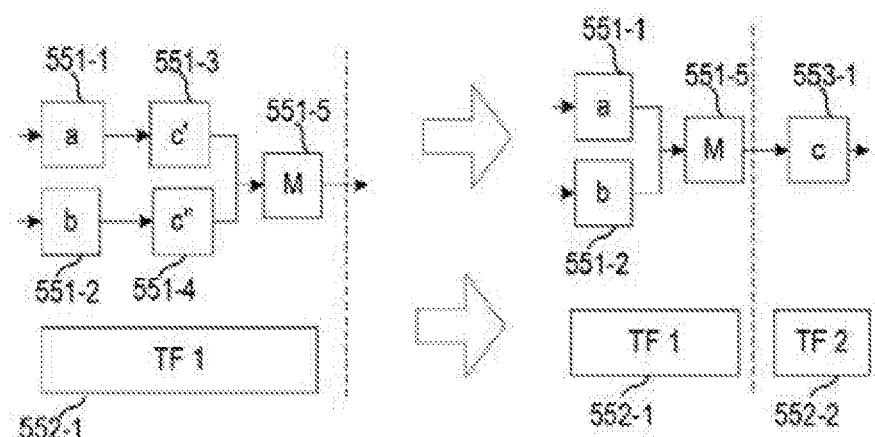

FIGS. 5A-5B illustrate examples of distributing/factorizing a node over an n-ary node of a data flow graph of a hybrid flow according to the present disclosure. An n-ary node, as used herein, can include a node with a plurality of inputs and/or a plurality of outputs.

FIG. 5A illustrates an example of distributing a node (e.g., node c 548-4) over an n-ary node (e.g., node M 548-3). As illustrated in FIG. 5A, prior to distributing node c 548-4 over node M 548-3, node a 548-1, node b 548-2, and node M 548-3 belong to TF 1 549-1 and node c 548-4 belongs to TF 2 549-2. Distribution, as used herein, can include an algebraic technique to move operator nodes. For example, $x*(a+b)$ is equivalent to $(x*a)(x*b)$. Thereby, the multiplier x can be distributed over the addition.

To distribute node c 548-4 over node M 548-3, homologous versions of node c 548-4 can be produced (e.g., node c' 550-1 and node c" 550-2), node c 548-4 can be removed, and node c' 550-1 and node c" 550-2 can be placed to the applicable input branches of node M 548-3. Node c' 550-1 and node c" 550-2 can include representations of homologous operators (e.g., homologous operator nodes). Homologous operators, as used herein, can include operators that are the same type (e.g., perform the same computation) but on different data and schemata. As illustrated in Figured 5A, node c' 550-1 and node c" 550-2 placed as a producer of node M 548-3 can get the flow ID and execution engine metadata of the producer of node M 548-3 prior to switching places with node c 548-4 (e.g., node a 548-1 and node b 548-2). That is, node c' 550-1 and node c" 550-2 belong to TF 1 549-1 with node a 548-1, node b 548-2, and node M 548-3.

Further, the new homologous operator nodes (e.g., node c' 550-1 and node c" 550-2) can inherit the metadata of node c 548-4. If node c 548-4 has node metadata (e.g., indicated by a value of the node metadata attribute equaling a particular value, such as −1), then the value of the node metadata attribute assigned to node c' 550-1 and node c" 550-2 points to the node metadata (e.g., via a node ID) of node c 548-4. If node c 548-4 has an assigned node metadata attribute value that does not equal the particular value (e.g., does not equal −1), then the assigned node metadata value points to the node metadata (e.g., via a node ID) of the node that node c 548-4 originally comes from (e.g., node c 548-4 is a clone node from a previous operation). In either instance, the node metadata of node c 548-4 is copied to the homologous operator nodes (e.g., node c' 550-1 and node c" 550-2) and a value of a node metadata attribute is assigned to the homologous operator nodes to point to the node ID for recovering them. And, because node M 548-3 is an n-ary operator, a node attribute for node M 548-3 is updated (e.g., called card_origin) to show which operators populate (e.g., are producers) the input schemata of node M 548-3.

FIG. 5B illustrates an example of factorizing nodes (e.g., node c' 551-3 and node c" 551-4) over an n-ary node (e.g., node M 551-5). As illustrated in FIG. 5B, prior to factorizing node c' 551-3 and node c" 551-4 over node M 551-5, node a 551-1, node b 551-2, node c' 551-3, node c" 551-4 and node M 551-5 belong to TF 1 552-1. Node c' 551-3 and node c" 551-4 can include homologous operator nodes, as discussed in FIG. 5A. Factorization, as used herein, can include an algebraic technique to move operator nodes. For example, $(x*a)+(x*b)$ is equivalent to $x*(a+b)$. Thereby, the multiplier x can be factored out.

To factorize node c' 551-3 and node c" 551-4 over node M 551-5, node c' 551-3 and node c" 551-4 can be combined in the data flow graph to form node c 553-1, node c 553-1 is place to the applicable output branch of node M 551-5, and node a 551-1 and node b 551-2 are placed to the applicable input branches of node M 551-5. Node c 553-1 can inherit metadata (e.g., the computation on different data and schemata) of node c' 551-3 and node c" 551-4 (e.g., as discussed in FIG. 5A). That is, node c 551-3 can perform the same computation as node c' 551-3 and node c" 551-4 on the combined data and schemata of node c' 551-3 and node c"551-4.

As illustrated in FIG. 5B, node c 553-1 placed as a consumer of node M 551-5 can get the flow ID and execution engine metadata of node M 551-5 or of the consumer node of node c 553-1 after the factorization based on the cost of shipping data from an engine that TF 1 552-1 runs on to an engine that TF 2 552-2 runs on. That is, node c 553-1 can belong to TF 1 552-1 or TF 2 552-2. The example illustrated in FIG. 5B illustrates node c 553-1 belonging to TF 2 552-2, although examples in accordance with the present example are not so limited. That is, node a 551-1, node b 551-2, and node M 551-5 belong to TF 1 552-1 and node c 553-1 belongs to TF 2 552-2. Further, the position identifier of node c 553-1 is updated. And, because node M 551-5 is an n-ary operator, a node attribute for node M 551-5 is updated (e.g., called card_origin) to show which operators consume (e.g., are consumer) the output schemata and which operators produce (e.g., are producers) the input schemata of node M 551-5.

Although the examples of FIGS. 5A-5B illustrate a particular number of each particular feature (e.g., nodes, additional nodes, and branches), examples in accordance with the present disclosure are not so limited. The number of each particular feature can include a variety of numbers that may be more or less than illustrated in FIGS. 5A-5B, for instance. For example, distribution/factorization of a node over an n-ary node can include more than two branches, and thereby more than two homologous nodes can be added or deleted.

In addition, the number of task flows can include more or less than two task flows and the placement of distributed/factorized operator nodes can include a variety of placements other than that illustrated in FIGS. 5A-5B. The placement of the distributed/factorized operator nodes (e.g., which task flow a distributed or factorized operator node belongs to) can depend on the cost of shipping data. An example of a variety of numbers of task flows and placements based on cost is illustrated in FIGS. 3A-3D.

Figure 6A:
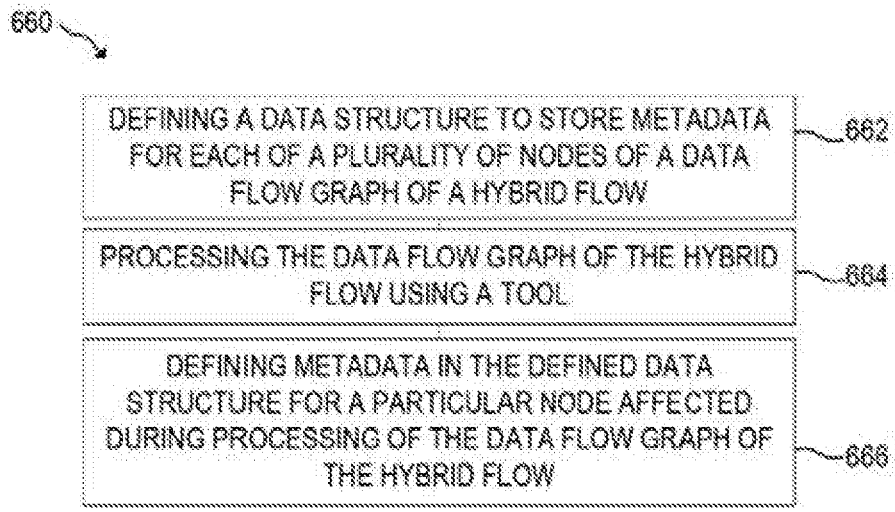
FIGS. 6A-6B illustrate flow charts of examples of methods for processing a data flow graph of a hybrid flow according to the present disclosure.
Figure 6B:
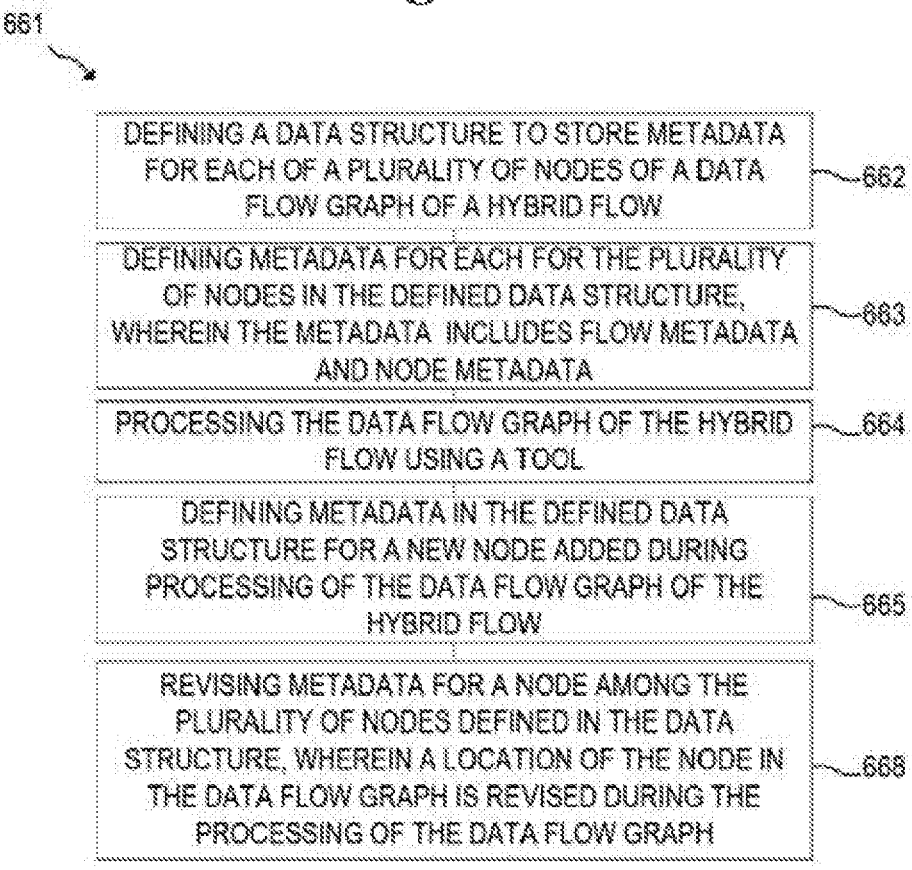

FIGS. 6A-6B illustrate flow charts of examples of methods far processing a data flow graph of a hybrid flow according to the present disclosure. For instance, FIG. 6A illustrates a flow chart of an example method 660 for processing a data flow graph of a hybrid flow. At 662, the method 660 can include defining a data structure to store metadata for each of a plurality of nodes of a data flow graph of a hybrid flow. The metadata can include flow metadata and node metadata, for instance.

At 664, the method 660 can include processing the data flow graph of the hybrid flow using a tool. The tool, various examples, can include an optimizer and the processing can include a global optimization of the data flow graph of the hybrid flow.

At 666, the method 660 can include defining metadata in the defined data structure for a particular node affected during processing of the data flow graph of the hybrid flow. The particular node can include a new node added during processing of the data flow graph of the hybrid flow by the tool and/or a node among the plurality of nodes, wherein the node is revised during processing of the data flow graph of the hybrid flow by the tool. The particular node can be a new node added and/or revised in an alternative data flow graph (e.g., a state), for instance.

For instance, the method 660 in various examples can include tracking metadata changes for each of a plurality of alternative data flow graphs (e.g., states) created during processing of the data flow graph. The tracked metadata changes can include changed metadata for the particular node (e.g., a revised node or a new node) of an alternative data flow graph among the plurality of alternative data flow graphs. Thereby, the particular node affected by processing of the data flow graph can be a node in an alternative version of the data flow graph (e.g., a state). The particular node can include, for instance, a node that is unique (e.g., metadata for the revised node or metadata for the new node has not yet been defined) as compared to nodes in previously created alternative data flow graphs among the plurality of alternative data flow graphs. By defining metadata in the defined data structure for unique nodes in the alternative data flow graphs, the amount of memory used to store the metadata may not be proportional to the number of alternative data flow graphs. The amount of memory for each alternative flow can depend on the number of new nodes or revised nodes that have not yet appeared in any previously created alternative flow graph.

FIG. 6B illustrates a flow chart of an example method 661 for converting a hybrid flow. The method 661 can include defining a data structure to store metadata for each of a plurality of nodes of a data flow graph of a hybrid flow, and processing the data flow graph of the hybrid flow using a tool, as illustrated by 662 and 664 of FIG. 6A and FIG. 6B.

At 663, the method 661 can include defining metadata for each of the plurality of nodes in the defined data structure, wherein the metadata includes flow metadata and node metadata. The defined data structure can include, for instance, an index data structure and/or a defined data structure (e.g., CDATA) stored in the data flow specification.

At 665, the method 661 can include defining metadata in the defined structure for a new node added during processing of the data flow graph of the hybrid flow. For instance, the new node can include a clone node of a node among the plurality of nodes and/or a specialized connector node.

Further, in various examples, at 668, the method 661 can include revising metadata for a node among the plurality of nodes defined the data structure, wherein a location of the node in the data flow graph is revised during the processing of the data flow graph. For instance, a location can be revised by switching positions of two nodes, such as a two unary nodes.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for processing a data flow graph of a hybrid flow, comprising:

storing, by a processor of a computing device, flow metadata and node metadata for each of a plurality of nodes of a data flow graph of an input hybrid flow in a data structure;

assigning, by the processor, a value of a node metadata attribute to each of the plurality of nodes of the data flow graph of the input hybrid flow, wherein each assigned node metadata attribute value identifies the node metadata;

creating, by the processor, a set of duplicated nodes that duplicates a set of original nodes in the data flow graph that performs a particular function during processing of the data flow graph;

adding, by the processor, the set of duplicated nodes into the data flow graph in parallel with the set of original nodes to perform the same particular function as the set of original nodes;

executing, by the processor, the particular function in the set of original nodes and in the set of duplicated nodes to generate an optimized result of the particular function;

defining, by the processor, node metadata for the set of duplicated nodes in the data structure; and converting, by the processor, the data flow graph into an output hybrid flow based on the node metadata of the plurality of nodes and the node metadata of the set of duplicated nodes in the data structure.

2. The method of claim 1, further comprising: storing the flow metadata for the data flow graph in a specification of the data flow graph of the input hybrid flow.

3. The method of claim 1, wherein storing the flow metadata and node metadata for each of the plurality of nodes includes:

assigning a unique node identifier to each of the plurality of nodes; and defining an index data structure to store the node metadata for each of the plurality of nodes of the data flow graph of the hybrid flow, wherein each node identifier is used to index the index data structure to access the node metadata.

4. The method of claim 1, including:

tracking metadata changes for each of a plurality of alternative data flow graphs during processing of the data flow graph;

wherein the tracked metadata changes for one of the plurality of alternative data flow graphs includes metadata for a particular node affected in the data flow graph; and wherein the particular node is a unique node as compared to nodes in previously created alternative flow graphs among the plurality of alternative data flow graphs.

5. The method of claim 1, further comprising:

adding a fork node to split a flow of the data graph into two paths that are respectively connected to the set of original nodes and the set of duplicated nodes;

adding a merger node to merge outputs of the set of original nodes and the set of duplicated nodes into one flow; and defining the node metadata for the fork node and the merger node in the data structure.

6. A non-transitory computer-readable medium storing a set of instructions executable by a processing resource to cause a computer to:

store flow metadata and node metadata for each of a plurality of nodes of a data flow graph of an input hybrid flow, wherein the node metadata is stored in an index data structure;

assign a value of a node metadata attribute to each of the plurality of nodes of the data flow graph of the hybrid flow, wherein each assigned node metadata attribute value identifies the node metadata in the index data structure;

create a set of duplicated nodes that duplicates a set of original nodes in the data flow graph that performs a particular function during processing of the data flow graph;

add the set of duplicated nodes into the data flow graph in parallel with the set of original nodes to perform the same particular function as the set of original nodes;

execute the particular function in the set of original nodes and in the set of duplicated nodes to generate an optimized result of the particular function;

define node metadata in the index data structure for the set of duplicated nodes;

revise the stored metadata after processing the data flow graph including: update the node metadata for a node among the plurality of nodes, wherein a location of the node in the data flow graph of the hybrid flow is revised during the processing of the data flow graph; and convert the data flow graph into an output hybrid flow based on the node metadata of the plurality of nodes and the node metadata of the set of duplicated nodes in the index data structure.

7. The non-transitory computer-readable medium of claim 6, wherein the set of instructions executable by the processing resource to assign the value of the node metadata attribute to each of the plurality of nodes includes instructions executable to assign a particular value of a node metadata attribute to the plurality of nodes.

8. The non-transitory computer-readable medium of claim 6, wherein the set of instructions executable by the processing resource to assign the value of the node metadata attribute to each of the plurality of nodes includes instructions executable to:

assign a value of a node metadata attribute to each node in the set of duplicated nodes added during the processing of the data flow graph of the input hybrid flow, wherein the assigned metadata attribute value of each node in the set of duplicated nodes is a node identifier of the node.

9. The non-transitory computer-readable medium of claim 6, wherein the set of instructions executable by the processing resource to update the node metadata for the node among the plurality of nodes includes instructions executable to revise a flow identifier for the node in response to the revised location of the node including a different execution engine.

10. The non-transitory computer-readable medium of claim 9, wherein the set of instructions executable by the processing resource to update metadata for the node among the plurality of nodes includes instructions executable to:

attach an auxiliary processing node to the node, wherein the value of the node metadata attribute and a position identifier of the auxiliary processing node is not revised from the value of the node metadata attribute and a position identifier of the node.

11. The non-transitory computer-readable medium of claim 6, wherein the set of instructions includes instructions to:

add a fork node to merge outputs of the set of original nodes and the set of duplicated nodes into one flow;

add a merger node to merge outputs of the set of original nodes and the set of duplicated nodes into one flow; and define the node metadata for the fork node and the merger node in the index data structure.

12. A system for processing a data flow graph of hybrid flow, comprising:

a processing resource; and a memory resource containing instructions that are executable by the processing resource to cause the processing resource to:

store metadata for each of a plurality of nodes of a data flow graph of an input hybrid flow in a defined data structure, wherein the metadata includes flow metadata and node metadata;

assign a value of a node metadata attribute to each of the plurality of nodes of the data flow graph of the input hybrid flow, wherein each assigned node metadata attribute value identifies the node metadata;

create a set of duplicated nodes that duplicates a set of original nodes in the data flow graph that performs a particular function during processing of the data flow graph;

add the set of duplicated nodes into the data flow graph in parallel with the set of original nodes to perform the same particular function as the set of original nodes;

execute the particular function in the set of original nodes and in the set of duplicated nodes to generate an optimized result of the particular function;

define node metadata for the set of duplicated nodes in the data structure; and convert the data flow graph into an output hybrid flow based on the node metadata of the plurality of nodes and the node metadata of the set of duplicated nodes.

13. The system of claim 12, wherein the instructions are executable to cause the processing resource to:

add a fork node to split a flow of the data graph into two paths that are respectively connected to the set of original nodes and the set of duplicated nodes;

add a merger node to merge outputs of the set of original nodes and the set of duplicated nodes into one flow; and define the node metadata for the fork node and the merger node based on a producer node of the set of duplicated nodes and a consumer node of the set of duplicated nodes.

14. The system of claim 12, wherein the instructions are executable to cause the processing resource to:

switch a position of a first node among the plurality of nodes with a second node among the plurality of nodes in the data flow graph of the input hybrid flow; and update the metadata in the defined data structure based on the switched position of the first node and the second node.

15. The system of claim 14, wherein:

the first node includes a connector operator node and the second node includes a node connected to the connector operator node;

the instructions are executable to cause the processing resource to update the node metadata of the second node to include an execution engine of a third node among the plurality of nodes, wherein the third node includes a node connected to the first node prior to the switch of the position of the first node and the second node.

16. The system of claim 14, wherein the instructions are executable to cause the processing resource to update a position identifier of the switched position of the first node and the second node based on the value of the node metadata attribute assigned to the first node and the second node.

17. The system of claim 12, wherein the instructions are executable to cause the processing resource to:

distribute a unary node among the plurality of nodes over an n-ary node among the plurality of nodes in the data flow graph during processing of the data flow graph of the hybrid flow; and wherein the set of duplicated nodes includes a homologous node of the unary node.

\* \* \* \* \*